United States Patent
Burton

(10) Patent No.: US 7,196,500 B2
(45) Date of Patent: Mar. 27, 2007

(54) DOWNLOCKING AND/OR UPGRADING INTEGRATED CIRCUIT

(75) Inventor: Edward A. Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 10/750,584

(22) Filed: Dec. 31, 2003

(65) Prior Publication Data

US 2005/0143010 A1 Jun. 30, 2005

(51) Int. Cl.
*G05F 1/40* (2006.01)
*H02M 1/00* (2006.01)

(52) U.S. Cl. .................................................. 323/266

(58) Field of Classification Search ........ 323/234, 323/265, 266, 268, 271, 282, 293; 363/144, 363/147; 257/207, 208; 455/67.11, 67.14, 455/68

See application file for complete search history.

(56) References Cited

U.S. PATENT DOCUMENTS

| 4,667,121 | A | | 5/1987 | Fay et al. |
| 5,099,196 | A | | 3/1992 | Longwell et al. |
| 5,659,270 | A | * | 8/1997 | Millen et al. ................. 331/69 |
| 6,552,958 | B2 | * | 4/2003 | Shikata et al. .............. 365/233 |
| 6,772,382 | B2 | * | 8/2004 | Schaber et al. ............. 714/744 |
| 6,911,840 | B1 | * | 6/2005 | Milne et al. .................. 326/38 |

* cited by examiner

*Primary Examiner*—Matthew V. Nguyen
(74) *Attorney, Agent, or Firm*—Schwabe, Williamson & Wyatt, P.C.

(57) ABSTRACT

An integrated circuit distribution and upgrade method, and systems/devices to practice various aspect of the method that is for reducing power consumption and operating the integrated circuit with a constituent operating circuit and a proxy circuit near the lower end of the targeted voltage range.

37 Claims, 7 Drawing Sheets

DOWNLOCKING AND/OR UPGRADING INTEGRATED CIRCUIT

TECHNICAL FIELD & BACKGROUND

The present invention is related to the field of integrated circuit. More specifically, various aspects of the present invention are related to distribution and upgrade of integrated circuits.

Advances in integrated circuit (IC) technology have led to significant increases in the operational frequencies of IC. Typically, a manufacturer of an IC designs and guarantees the IC to operate properly up to a specification maximum operational frequency, if voltage supplied to the IC is within a targeted voltage range. Generally, to reduce power consumption, it is desirable to operate the IC near the lower end of the targeted voltage range.

In addition to being dependent on the applied voltage, the operational frequency of an IC may also be dependent at least in part on the temperature of the IC, the age of the IC, and/or other factors. Thus, various environmental limits, such as, but not limited to, temperature, voltage and so forth, are specified to facilitate a system designer to manage the usage of the IC, to ensure it functions properly. These environmental limits are typically conservatively specified (guardbanded) to accommodate among other things, aging of the IC. The level of conservatism (or magnitude of the guardband) varies from manufacturer to manufacturer, depending in part on the quality experience of the manufacturer.

Additionally, there are often different price-performance points a type of IC (e.g. microprocessor) needs to meet, further complicating the manufacturing and distribution of IC.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Embodiments of the present invention include, but are not limited to, an IC having operational circuits and a proxy circuit to output a periodic signal (proxy signal) at a frequency (proxy frequency) reflective of a potential the operational frequency of the operational circuits, a voltage regulator controller integrated or associated with the IC to regulate voltage applied to the IC based at least in part on the proxy signal provided by the proxy circuit, and a system having such an IC. Embodiments of the present invention further include methods for distributing and field upgrading the IC, client and system devices to practice the methods.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
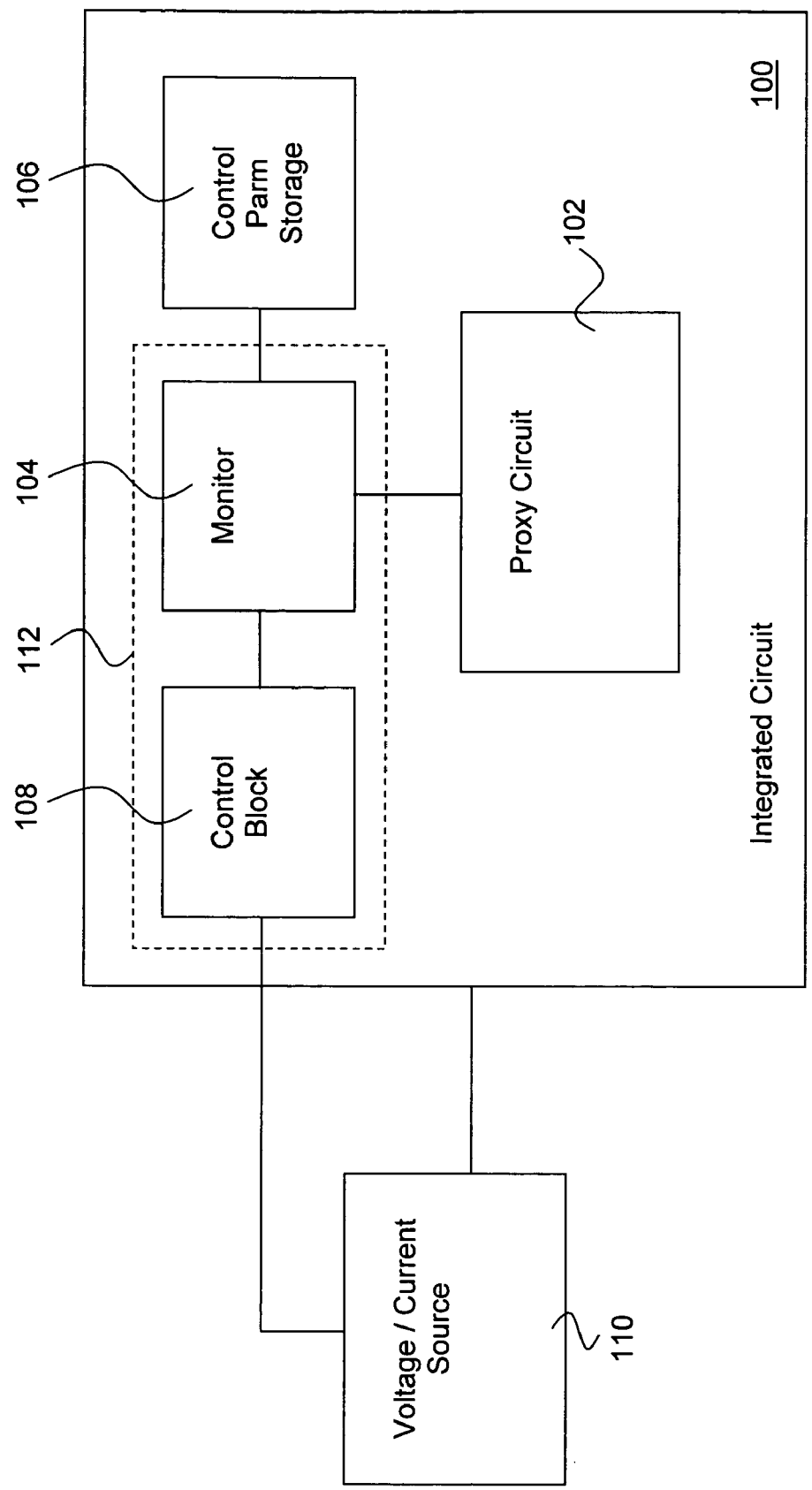
FIG. 1 illustrates a block diagram of an integrated circuit, in accordance with one embodiment of the present invention.

Referring now to FIG. 1, wherein a block diagram view of an IC in accordance with one embodiment, is shown. As illustrated, IC 100 receives its current supply from voltage/current source 110. IC 100 includes a number of operational circuits (not shown). Further, IC 100 advantageously includes proxy circuit 102 (which also draws current from the same source 110). For the illustrated embodiment, IC 100 also includes control parameter storage 106 and light weight voltage regulator controller 112. The illustrated elements are coupled to each as shown.

Operational circuits are employed to provide the functions IC 100 is designed to offer. The functions, and therefore, operational circuits are application dependent, and the application may be of any kind. In one embodiment, IC 100 implements a general purpose microprocessor. In other embodiments, IC 100 may be a graphics processor, a network processor, other application specific integrated circuits (ASIC), or a reconfigurable integrated circuit, such as, but not limited to, Field Programmable Gate Array (FPGA) and so forth.

Proxy circuit 102 is employed to generate a periodic signal (proxy signal) at a frequency (proxy frequency) that is reflective of a potential of the operational frequency of an operational portion of IC 100 of interest (hereinafter, the constituent operational circuit). Recall that the operational frequency is dependent at least in part on the voltage applied, the temperature, and the age of an IC, accordingly, in various embodiments, proxy circuit 102 may be formed at a location of the IC that is near the constituent operational circuit, which operational frequency potential is to be reflected. Such proximal placement allows proxy circuit 102 to substantially experience the same process variations in its formation, as well as ambient influences during operation, as the constituent operational circuit which operational frequency it is to reflect. However, in other applications, for other reasons, proxy circuit 102 need not be so proximally placed.

In various embodiments, proxy circuit 102 is a ring oscillator, which on application of power, continuously generates a periodic signal (proxy signal) at a frequency (proxy frequency). The oscillator toggles per unit time is a measure of frequency. The number of stages or the length of the ring oscillator is implementation dependent. In particular, it may be dependent on the manner the oscillator's frequency is measured. In alternate embodiments, other periodic signal generation circuits may be employed. Further, it is anticipated that in some embodiments, proxy circuit 112 may have configurable elements, to allow customization of the characteristics of the proxy signal.

Light weight voltage regulator controller 112 is employed to conditionally regulate the voltage applied to IC 100 by source 110, based at least in part on the potential of the operational frequency of all or a subset of the operational circuit(s) of IC 100, as reflected by the proxy frequency of the proxy signal. For the illustrated embodiment, voltage regulator controller 112 includes monitor 104 and control block 108, coupled to each other as shown. Voltage regulator controller 112 is referred to as light weight, because for the intended usage, it is not necessary for voltage regulator controller 112 to include elements, such as inductors, bulk caps, and so forth.

For the embodiment, monitor 104 is employed to detect the difference between the proxy frequency and a target of the proxy frequency. The target of the proxy frequency is typically determined at manufacturing time, or more specifically, quality testing time, when the specification maximum of the operational frequency of the constituent operational circuit is determined. The specification maximum of the operational frequency of the constituent operational circuit at a particular temperature, may be determined e.g. through a binary search, while IC 100 is held at the particular temperature. The search may also be conducted employing a voltage reference. Typically, the searches are conducted for a number of temperatures in a temperature range. Other methods may also be employed to determine the specification maximum of the operational frequency. Couple of embodiments of monitor 104 will be described later, referencing FIG. 2-3.

As will be readily apparent from the descriptions to follow, in alternate embodiments, the responsibilities of monitor 104 may be more or less. That is, in these alternate embodiments, some of the responsibilities of monitor 104 may be "pushed out" to control block 108, or vice versa. That is, the demarcation between monitor 104 and control block 106 is partially arbitrarily, and implementation dependent.

For the embodiment, control block 108 is employed to generate control signals for source 110, based at least in part on the outputs of monitor 104. In various embodiments, the control signals control the pulse widths of various transistors employed by source 110 in generating current for IC 100.

In general, control block 108 is employed to generate control signals to decrease the voltage applied to IC 100 if the potential of the operational frequency of the constituent operational portion of IC 100 is believed to be higher than its target operational frequency, and to generate control signals to increase the voltage applied to IC 100 if the potential of the operational frequency of the constituent operational portion of IC 100 is believed to be lower than its target operational frequency.

Further, the amount of increase/decrease is in general a function of the amount of difference detected for the proxy frequency and its target (which may be selected based on a target maximum operational frequency for the constituent operational circuit). However, other factors, such as temperature of IC 100, age of IC 100, as well as precision desired (i.e. granularity of control), may be taken into consideration, in generating the control signals to increase or decrease the voltage and/or current applied. The functional relationship between the adjustment to be undertaken and the factors to be considered, may be linear or non-linear, depending substantially on the design and usage characteristics of IC 100, and it is typically, though not necessarily, empirically determined.

In various embodiments, depending on the sophistication of the models, and therefore, the complexity of the "calculations" required to generate the control signals, control block 108 may be implemented with a relatively simple to a relatively complex circuit, including, but not limited to, a collection of gates configured with combinatorial logic, or a general purpose microcontroller programmed with control logic.

For the embodiment, control parameter storage 106 is employed to store various control parameters. In particular, for the embodiment, it is employed to store the target proxy frequency of the constituent operational portion of IC 100, and various control values to control the operation of voltage regulator controller 112, in particular, monitor 104. In various embodiments, the stored control parameters may also include an upward adjustment as well as a downward adjustment to the target proxy frequency of the proxy circuit, to be described more fully below.

In various embodiments, control parameter storage 106 may be implemented employing non-volatile storage, such as read-only-memory (ROM), electrically erasable ROM (EEPROM), flash memory, and so forth, and/or fuses, i.e. a combination thereof. In other embodiments, control parameter storage 106 may also be implemented employing volatile storage, such as random access memory (RAM) if facilities to save to, and restore from a persistent store of a host device hosting IC 100 are also provided.

Source 110 typically includes a number of transistors, diodes, inductors, capacitors and/or resistors coupled to one another to provide a voltage/current output. Source 110 may be a voltage/current supply of any kind, as long as it is able to meet the voltage and/or current requirement of IC 100, and includes an interface to allow its output voltage to be controlled by control block 108 by controlling e.g. one or more of its transistors.

Resultantly, by virtue of the ability to reliably estimate the operational frequency potential achievable by the operational circuits, and adjust the voltage applied to IC 100 accordingly, it is expected that the specification maximum operational frequency may be achieved with voltage near the lower end of the design voltage range. Thus, it is expected that the specification maximum operational frequency is likely to increase, but at the same time, there will be substantial power savings.

Further, in various embodiments, control parameter storage 106 may also be employed to store various environmental limits to be monitored and managed, to ensure the proper operation of IC 100. Examples of environmental limits include, but are not limited to various critical temperature limits, nominal maximum operational frequency, minimum and maximum voltage, and so forth. These environmental limits are employed by light weight voltage regulator controller 112 and/or various off-chip system management facilities to manage the operation of a host system, of which IC 100 is a component. From the description to follow, it will be appreciated by those of ordinary skill in the art, that by virtue of the novel features and methods of the present invention, typically, these environmental limits may be set more aggressively to "lower" limits. It is expected that employment of various embodiments of the present invention will likely lead to significant reduction in all or selected ones of the typical environmental limits.

Additionally, IC 100 may also include a special mode of operation for the above described calibration and determination of the specification maximum operational frequency (including the target for the proxy frequency), and a number of environmental factor sensors or circuits, such as, but not limited to, voltage sensors, temperature sensors, and so forth, as well as an input terminal for the provision of voltage references, to facilitate the calibration and determination.

While for ease of understanding, voltage regulator controller 112 (with monitor 104 and control block 108) and control parameter storage 106 are being illustrated as part of IC 100, in alternate embodiments, one or more of these elements or sub-elements may be located off chip, on e.g. a circuit board, to which IC 100 is mounted.

Further, while also for ease of understanding, only one proxy circuit 102 is shown, in alternate embodiment, IC 100 may employ multiple proxy circuits 102, one each for different constituent regions. For these embodiments, voltage regulator controller 112 (with monitor 104 and control block 108) and control parameter storage 106 may be modified to cooperate with the multiple proxy circuits 102 (e.g. interleavingly), or multiple sets of these resources, one for each proxy circuit 102 may be provided instead.

Figure 2:
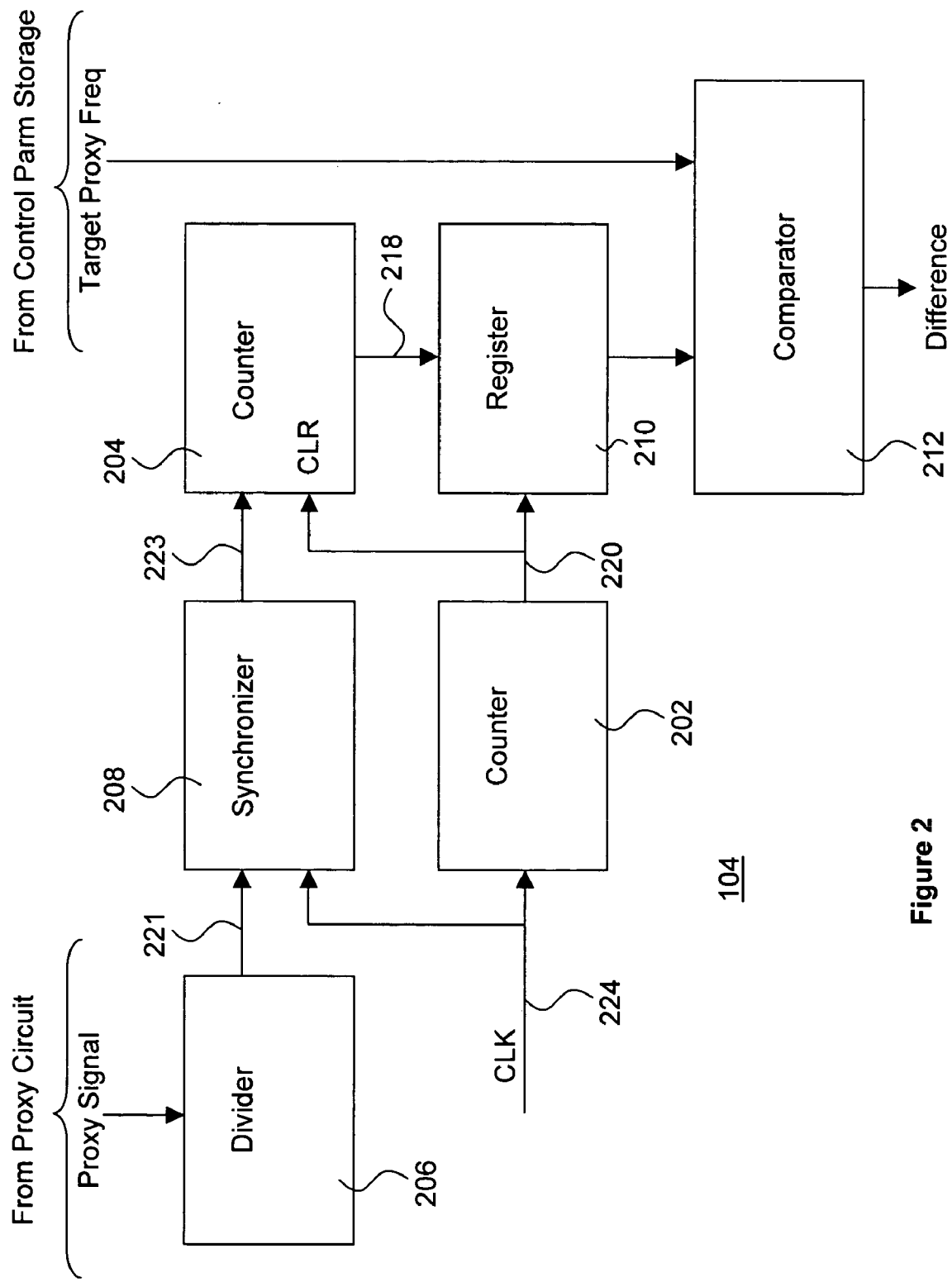
FIG. 2 illustrates the monitor of the voltage regulator controller FIG. 1 in further detail, in accordance with one embodiment.

FIG. 2 illustrates monitor 104 of voltage regulator controller 112 of FIG. 1 in further detail, in accordance with one embodiment. As illustrated, for the embodiment, monitor 104 includes counters 202–204, divider 206, synchronizer 208, register 210, and comparator 212, coupled to each other, proxy circuit 102, and control parameter storage 106 as shown.

Comparator 212 is employed to receive the determined proxy frequency, i.e. frequency of the proxy signal outputted by proxy circuit 102, (from register 210), and a target of the proxy frequency (from control parameter storage 106), and in response, generates an output indicating the difference between the two frequencies.

Counter 204 is employed to sample the proxy signal for a period of time, or more specifically, for the embodiment, a derived version of the proxy signal 213, to determine the frequency of the proxy signal, which as described earlier, is considered reflective of a potential of the operational frequency of the constituent operational circuit(s) of IC 100. Counter 204 includes in particular an input terminal to receive the derived version of the proxy signal 223, which is aligned with the operational cycles of the constituent operational circuit(s), to be described more fully below. Counter 204 further includes a "clear" (CLR) input terminal to receive control signal 220 to periodically clear it, to effectively control the start and stop of sampling (counting) for each time period. Counter 204 further outputs the determined proxy frequency for register 210.

Register 210 is employed to store the determined proxy frequency. Register 210 includes an input terminal to allow the same control signal 220 to be provided to control register 210 to latch the determined proxy frequency outputted by counter 204 at the end of a sampling period, synchronous to the time when counter 204 is being cleared to start sampling for a new time period, and to output a stored determined proxy frequency for comparator 212.

For the embodiment, divider 206 is employed to divide the periodic signal received from proxy circuit 102 to generate a derived version of the periodic signal 221. Typically, this derived version of the periodic signal 221 is not aligned with the operational cycles of the constituent operational circuit(s) of IC 100.

The terms "alignment" or "aligned" as used herein in the specification, and in the claims, refer to edges of the signal pulses being aligned, i.e. they substantially rise and fall together (in phase or phase shifted), but not necessary of the same frequencies. For example, for the purpose of this specification and the claims, a signal with a 200 MHz frequency and a signal with a 100 MHZ are considered aligned, if the edges of the pulses of the slower 100 MHZ signal substantially rise and fall with every other edges of the pulses of the twice as fast 200 MHZ signal (in phase or phase shifted).

Synchronizer 208 is employed to align the derived version of the proxy signal 221 with the operational cycles of the constituent operational circuit(s) of IC 100, and output the aligned version as derived version 223 to counter 204. Thus, synchronizer 208 receives the derived version 221 from divider 206, and clock signal (CLK) 224 as inputs. CLK 224 is a clock signal with a frequency that is either the same or a multiple of the frequency of the clock signal employed to drive the constituent operational circuit(s) (in phase or phase shifted). In other words, as an example, if a clock signal with a 800 MHz frequency is employed to generate a clock signal of 400 MHZ for the constituent operational circuit(s), CLK 224 may be a clock signal with a frequency of either 800 MHZ or 400 MHZ (in phase or phase shifted).

Counter 202 is employed to generate control signal 222. Counter 202 receives the same clock signal CLK as input, and counts accordingly. Counter 202 outputs its count as control signal 222.

While the embodiment of FIG. 2 employs counter 204 to determine the frequency of the proxy periodic signal outputted by proxy circuit 102, in alternate embodiments, the frequency of the proxy periodic signal may be determined via other approaches. For example, an implementation with proxy circuit 102 having an m stage oscillator, and counter 204 counting up to n cycles, may also be implemented with proxy circuit 102 having m×n stages, with the proxy frequency being determined based on the amount of delay incurred by a signal traversing through the m×n stages.

Figure 3:
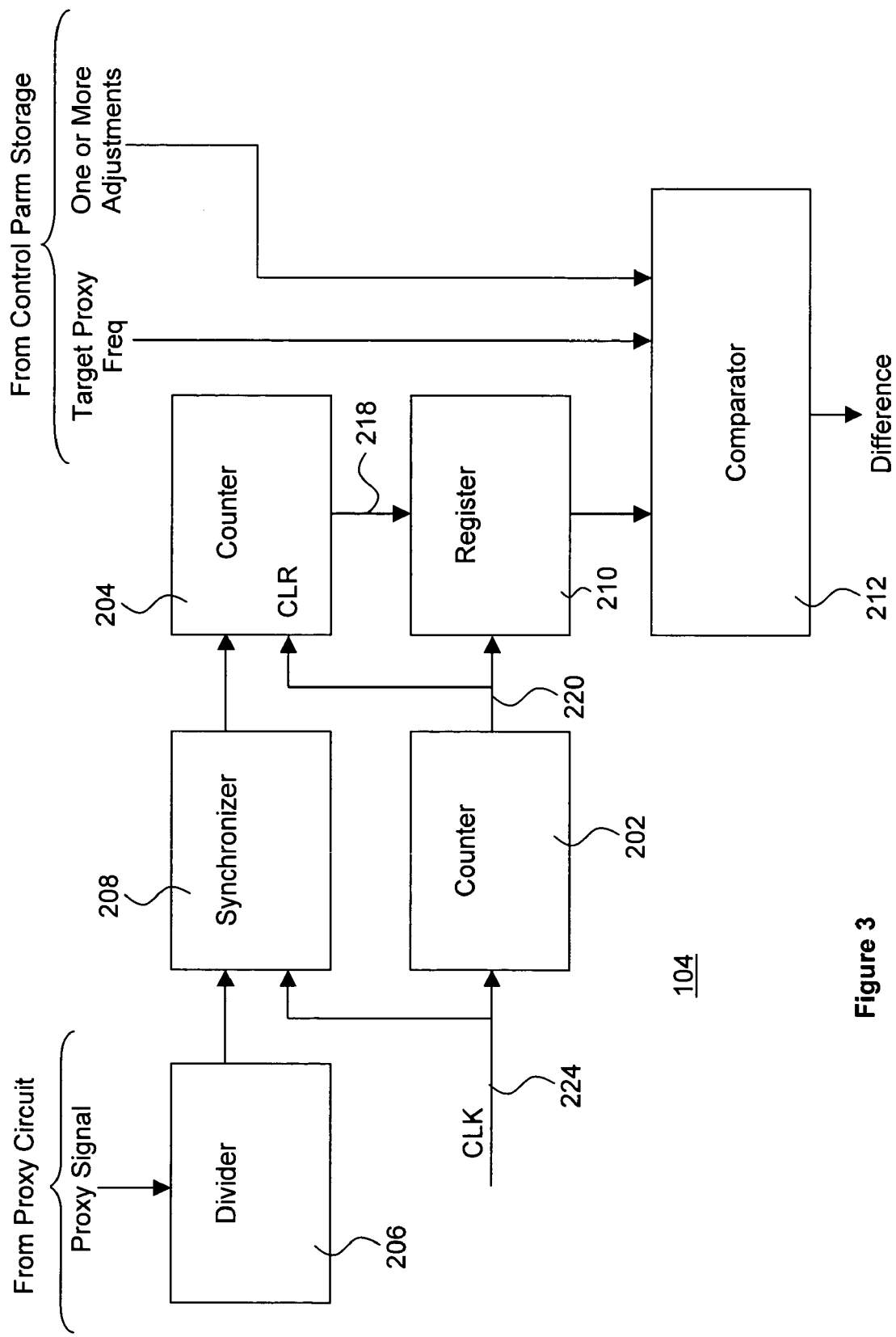
FIG. 3 illustrates the monitor of the voltage regulator controller of FIG. 1 in further detail, in accordance with another embodiment.

FIG. 3 illustrates monitor 104 of FIG. 1 in further detail, in accordance with another embodiment. The embodiment of FIG. 3 is substantially the same as the embodiment earlier described referencing FIG. 2, except that comparator 212 is enhanced to also receive one or more adjustments to the target of the proxy frequency to be taken into consideration when generating the difference between the determined proxy frequency and its target.

In various embodiments, the adjustments include an upward adjustment and a downward adjustment. The adjustments provide a manufacturer of IC 100 with a number of flexibilities in marketing the IC. For example, the upward adjustment may be employed to market IC 100 as a part with a lower specification maximum operational frequency, even though during production, it was tested and confirmed to be capable of operating reliably with a higher unadjusted specification maximum operational frequency. Presumably, IC 100 will be marketed with a downward price adjustment when compared to other IC marketed for operation with the higher unadjusted specification maximum operational frequency. However, subsequently, the downward adjustments may be employed to field upgrade IC 100 to operate with a higher specification maximum operational frequency, which could be as high as the original higher unadjusted specification maximum operational frequency or lower (reflecting the part's age), depending e.g. on the amount of an upgrade payment received. This is just one of many possible applications of the various embodiments of the present invention.

In alternate embodiments, comparator 212 may be merely enhanced to accept only one adjustment to the target proxy frequency. In other words, the adjustments are all summed into a net adjustment, before it is provided to comparator 212.

Note that for the same reason, the earlier described application may be practiced with the embodiment of FIG. 2 if all adjustments are factored into the target proxy frequency before it is provided to comparator 212.

In other words, similar to the earlier description of the demarcation between monitor 104 and control block 108 need not be as described, and may move in either direction with monitor 104 assuming some of the functions of control block 108 or vice versa, likewise, the demarcation between control parameter storage 106 and monitor 104 need not be as described either, and may move in either direction with control parameter storage 106 assuming some of the functions of monitor 104 (in particular, comparator 212), or vice versa.

Figure 4:
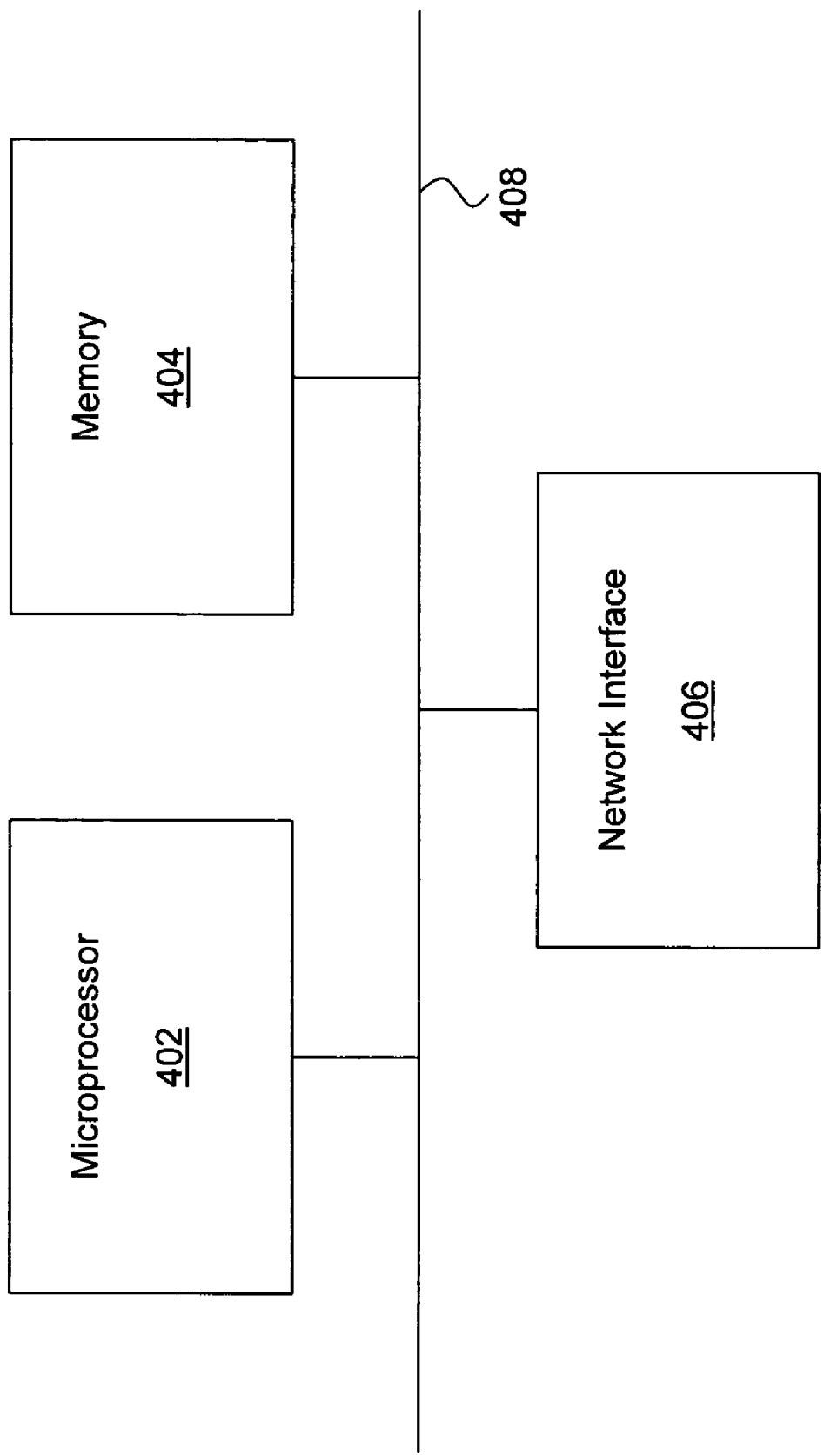
FIG. 4 illustrates a system having the IC of FIG. 1 in accordance with one embodiment.

FIG. 4 illustrates a system in accordance with one embodiment. As illustrated, for the embodiment, system 400 includes microprocessor 402, memory 404, and networking interface 406 coupled to each other, via bus 408. For the embodiment, microprocessor 402 is advantageously equipped with proxy circuit 102, voltage regulator controller 112 (with monitor 104 and control block 108) and control parameter storage 106, as early described for IC 100. Accordingly, the voltage applied to microprocessor 402 may be adjusted in view of the operational frequency microprocessor 402 is believed to be capable of, based on the experience of proxy circuit 102.

Beside the advantageous incorporation of elements 102, 106 and 112, microprocessor 402, memory 404, networking interface 406 and bus 408 all represent corresponding broad ranges of these elements known in the art or to be designed. Further, as described earlier, in alternate embodiments, all or portions of voltage regulator controller 112 may be disposed outside microprocessor 402.

Depending on the applications, system 400 may include other components, including but are not limited to non-volatile memory, mass storage (such as hard disk, compact disk (CD), digital versatile disk (DVD) and so forth), graphical or mathematic co-processors, and so forth.

In various embodiments, system 400 may be a personal digital assistant (PDA), a wireless mobile phone, a tablet computing device, a laptop computing device, a desktop computing device, a set-top box, an entertainment control unit, a digital camera, a digital video recorder, a CD player, a DVD player, or other digital device of the like.

Further, in various applications, system 400 may have multiple microprocessors having integrated or associated voltage regulator controllers as earlier described. Moreover, the multiple microprocessors may be multiple processor cores integrated on the same die.

Figure 5:
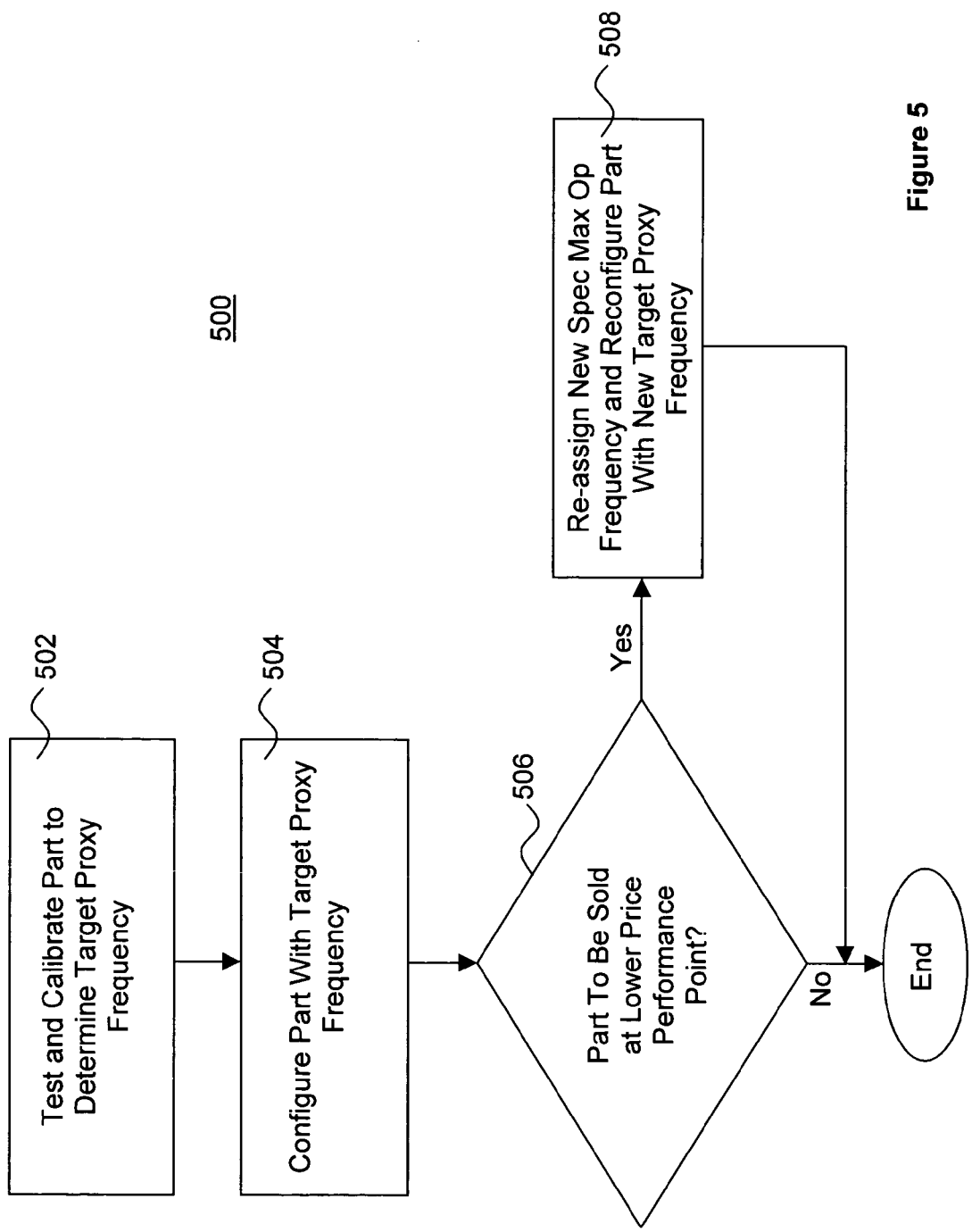
FIG. 5 illustrates a distribution method for the IC of FIG. 1, in accordance with one embodiment.

FIG. 5 illustrates a distribution method for the IC of FIG. 1, in accordance with one embodiment. The method provides a manufacturer with another approach that can be used in lieu of or in addition to the different functional integration approach (e.g. with or without on-chip cache in the case of a microprocessor) to meet different price-performance points. The approach has the potential advantage of enabling a manufacturer to offer different price-performance points in a more cost efficient manner.

For ease of understanding, the distribution method will be described in the context of an IC having one proxy circuit, and the proxy frequency of the proxy signal outputted by the proxy circuit is reflective of the potential of the operational frequency of the operational circuit of the IC. However, it is well within the ability of those of ordinarily skill in the art to modify and extend the method to cover situations where the proxy frequency of the proxy signal is merely reflective of the potential of the operational frequency of a constituent portion of the IC, and/or the IC having more than one proxy circuit.

As illustrated, upon fabrication, a target for the proxy frequency of the proxy signal is determined for each IC, op 502. In various embodiments, the target for the proxy frequency is determined in conjunction with nominally assigning a specification maximum operational frequency to the IC. The term "nominal" refers to the fact that under the novel method, the specification maximum operational frequency of an IC may be reassigned at distribution time, to be described more fully below.

Recall that specification maximum operational frequency is the fastest operational frequency a manufacturer would guarantee proper operation for the IC for a voltage range. Due to process variations and other factors, the fastest operational frequency a manufacturer would guarantee for a voltage range varies from IC to IC, even if they are of the same design, and manufactured by the same process. Typically, a manufacturer offers the ICs with different specification maximum operational frequencies as different price-performance bins.

In various embodiments, the nominal assignment is guided by the fastest operational frequency the IC is deemed to be able to reliably achieve. This fastest operational frequency the IC can reliably achieved is determined by testing the IC under various temperature and voltage conditions, and observe the operational frequencies reliably achieved under the various testing conditions, in particular, the voltage ranges these operational frequencies can be reliably achieved.

Conventionally, once assigned, an IC is seldom reassigned with another specification maximum operational frequency, unless it is for correcting an incorrect assignment. Concurrently, as described earlier, a number of guardband limits for temperature, voltage, and so forth would be conservatively selected for a system designer to manage and ensure the reliable performance of the IC. Again, the degree of conservatism varies from manufacturer to manufacturer, typically, dependent on the manufacturer's own quality experience.

However, as described, for the novel distribution method, the determined specification maximum operational frequency is only nominally assigned. Further, by virtue of the fact that the voltage applied to the IC is regulated based at least in part on the difference between the proxy frequency of the proxy signal and its target, the guardband limits may be set less conservatively (for a given quality history).

During the testing, the proxy frequency of the proxy signal is noted for each fastest operational frequency reliably achieved under a testing condition. The proxy frequency of the proxy signal corresponding to the reliably achieved fastest operational frequency used as a guide in assigning the specification maximum operational frequency, is selected as the target for the proxy frequency.

In various embodiments, in particular, those with voltage regulator controller 112 integrated as part of the IC, the IC is configured with the selected target proxy frequency, op 504. In other embodiments, where the voltage regulator controller 112 is not integrated as part of the IC, and is disposed on e.g. a system board on which the IC is attached, the target proxy frequency information may be distributed to the system manufacturer for configuration instead.

Subsequently, for various reasons, including but are not limited to a price-performance point (typically a lower price-performance point) having a shortage of parts due to e.g. unexpected higher demand, under this novel distribution method, the IC may be re-assigned with the specification maximum operational frequency of the particular price-performance bin instead, op 506–508.

Further, the IC is effectively re-configured with the target proxy frequency corresponding to the reliably achievable fastest operational frequency corresponding to the re-assigned specification maximum operational frequency. For an IC with integrated voltage regulator controller 112, the re-configuration may be effectuated by re-configuring the IC with a replacement target proxy frequency or an adjustment to it, op 508. Likewise, for IC to be used with voltage regulator controller 112 being disposed on a system board, the replacement target or adjustment information may be distributed to the system manufacturer to perform the configuration instead. This process, resulting in an IC being re-assigned to a lower price-performance bin, is also referred to as a downlocking process.

In various embodiments, in addition to or in lieu of the target of the proxy frequency, a number of other control variables, including but are not limited to bus-to-core frequency multiplier (of the constituent operational circuit), minimum or maximum Vcc, maximum temperature, bus frequency ratio multiplier, and so forth, may be downlocked.

Figure 6:
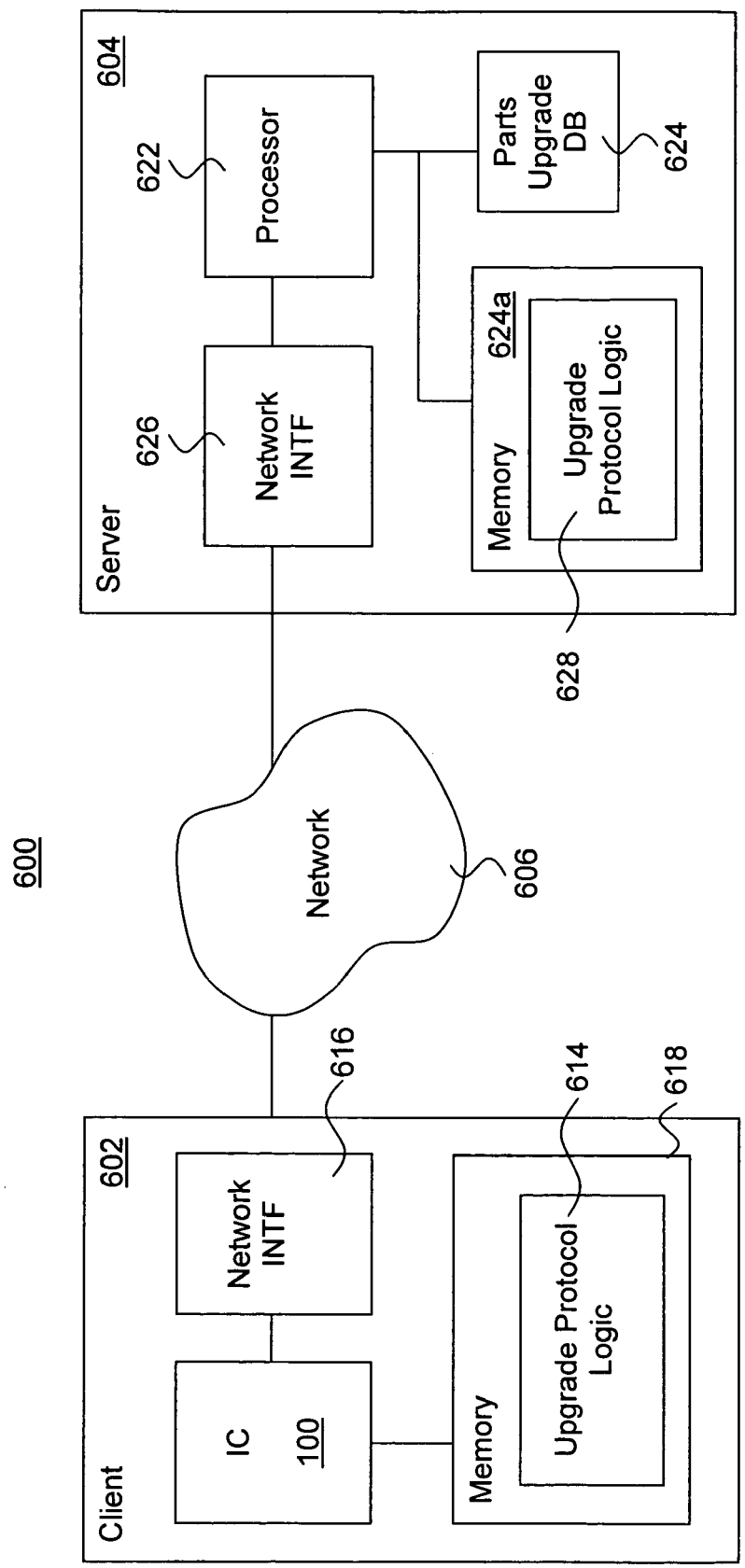
FIG. 6 illustrates a networking environment suitable for practicing a complementary upgrade method for the IC of FIG. 1, in accordance with one embodiment.

FIG. 6 illustrates a network embodiment suitable for practicing a complementary upgrade method for the IC of FIG. 1, in accordance with one embodiment. As illustrated, network environment 600 includes client device 602 and server device 604 coupled to each other via network 606.

Both client device 602 and server device 604 include appropriate networking interfaces 616 and 626, and device drivers (not shown) for communicating with each over network 606 in accordance with a mutually supported communication protocol, e.g. Transmission Control Protocol/Internet Protocol (TCP/IP). In various embodiments, network 606 includes the Internet.

For the illustrated embodiment, client device 602 further includes IC 100 in the form of a microprocessor, coupled to networking interface 616, and storage 614 coupled to IC 100 having programming instructions 618 designed to enable client device 602 to practice its part of the upgrade protocol.

Similarly, server device 604 further includes one or more processors 622, coupled to networking interface 626, and storage 624a coupled to processor(s) 612 having programming instructions 628 designed to enable server device 604 to practice its part of the upgrade protocol. For the embodiment, server device 624 also includes storage 624b having IC part upgrade information database stored therein.

In alternate embodiments, in lieu of IC 100 being a microprocessor, IC 100 may be other types of IC, and client device 602 includes another microprocessor to practice the client aspect of the upgrade protocol. In yet other embodiments, client device 602 may be practicing the client aspect of the upgrade protocol on behalf of another client device having IC 100, i.e. IC 100 is not disposed in the client device practicing the client aspect of the upgrade protocol.

Figure 7:
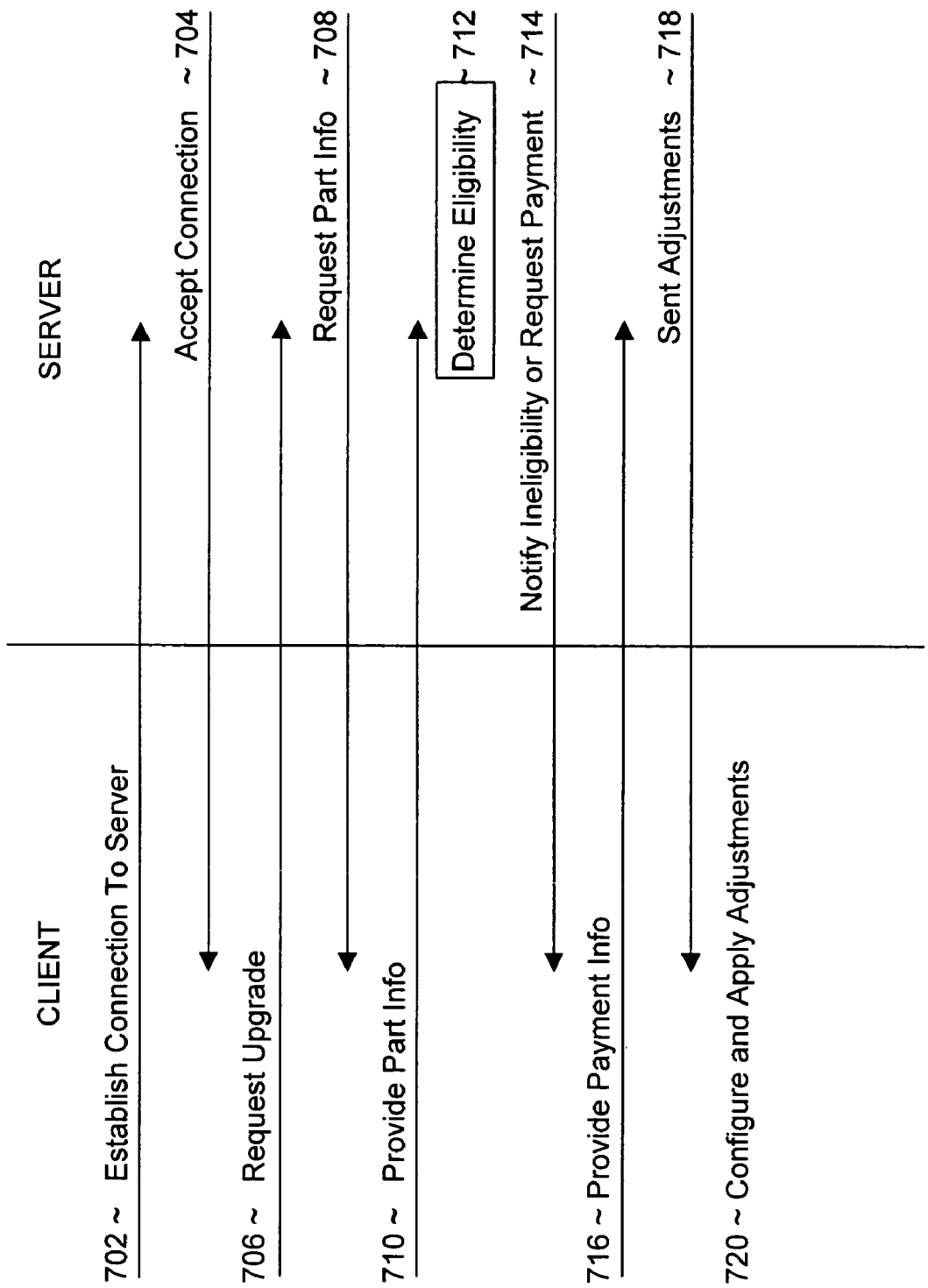
FIG. 7 illustrates the protocol of the complementary upgrade method, in accordance with one embodiment.

FIG. 7 illustrates the protocol between the client device and the server device of FIG. 6 in further detail, in accordance with one embodiment. As illustrated, the protocol starts with client device 602 and server device 604 establishing a connection with each other, 702–704. As described earlier, the connection may be of any type, including but are not limited to a TCP/IP connection.

After establishment of the connection, client device 602 in due course requests server device 604 for the upgrade data, 706. In response, for the embodiment, server device 604 requests client device 602 to provide identification information for the IC 100 to be upgraded, 708. In turn, client device 602 provides the requested identification information, 710.

In various embodiments, the identification information may be a serial number of the IC 100 which can lead to the identification of the product family, stepping, and/or the target proxy frequency associated. Alternatively, one or more of the information may be explicitly provided by client device 602 to server device 604. Further, in alternate embodiments, the identification information may be provided as part of the initial upgrade request.

These and other subsequent exchanges of information between client device 602 and server device 604 may be performed employing any one of a number of messaging protocols, including but are not limited to the HyperText Transmission Protocol (HTTP).

After receipt of the relevant identification information of IC 100 (directly or indirectly), service device 604 determines if an upgrade is available, 712. Service device 604 then notifies client device 602 of the result of the determination accordingly, i.e. whether an upgrade is available, 714. Typically, if an upgrade is available, payment for the upgrade is requested.

The determination may be performed by accessing, e.g. an upgrade database, locally located with server device 604, or on a remote storage. The upgrade database may be organized employing any one of a number of data organization techniques. Similarly, the retrieval may be effectuated employed any one of a number of data access techniques.

Assuming IC 100 may be upgraded, and client device 602 is so notified with a request for payment. Next, client device 602 may effectuate tender of payment, 716. The payment may be effectuated employing any one of a number of electronic payment techniques, directly to server device 604 or indirectly through a financial services third party. Further, the term "payment" as used herein includes monetary as well as non-monetary considerations, e.g. coupon.

After receipt of payment, service device 604 provides the upgrade data to client device 602, 718. As described earlier, the upgrade data may include a replacement target proxy frequency, a replacement adjustment for the associated target proxy frequency, or an additional adjustment to be applied to the associated target proxy frequency. In various embodiments, in addition to or in lieu of the target of the proxy frequency, the upgrade data may include replacement or adjustment to bus-to-core frequency multiplier (of the constituent operational circuit), minimum or maximum Vcc, maximum temperature, bus frequency ratio multiplier, and so forth. In other embodiments where the control logic for generating the control signals to regulate the voltage applied to the IC is implemented via microcode, the upgrade data may also include replacement of or modification to the microcode. The upgrade process is also referred to as an undownlocking process.

Further, the upgrade data may be provided in an encrypted form, employing any one of a number of encryption/decryption techniques.

After receipt (and if applicable, recovery) of the upgrade data, client device 602 causes IC 100 to be upgraded, 720, by effectively associating IC 100 with the upgraded target proxy frequency and/or one or more of the above described control variables and voltage regulation microcode, by configuring IC 100 or its host system board with the upgrade data.

Thereafter, during operation, regulation of voltage to be applied to IC 100 is based in part on the upgraded target proxy frequency instead.

CONCLUSION AND EPILOGUE

Thus, it can be seen from the above descriptions, a novel integrated circuit distribution method, a novel complementary upgrade method, systems equipped to practice various aspects of the methods, have been described. While the present invention has been described in terms of the foregoing embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:
    determining for an integrated circuit (IC) a target for a proxy frequency of a periodic signal, the target proxy frequency to be associated with the IC and taken into consideration in regulating voltage to be applied to a constituent operational circuit of the IC, the proxy frequency being reflective of a potential of an operational frequency of the constituent operational circuit, and the IC, in addition to the constituent operational circuit, further having a proxy circuit that outputs a proxy signal; and downlocking at least a selected one of the target of the proxy frequency, a bus-to-core frequency multiplier of the constituent operational circuit, a minimum Vcc, a maximum Vcc, a maximum temperature, and a bus frequency ratio multiplier associated with the IC.

2. The method of claim 1, wherein said determining comprises testing the IC, and selecting an operational frequency of the constituent operational circuit observed during said testing to be a specification maximum operational frequency for the constituent operational circuit.

3. The method of claim 2, wherein said selecting of an operational frequency of the constituent operational circuit observed during said testing comprises selecting the fastest operational frequency of the constituent operational circuit observed during said testing.

4. The method of claim 2, wherein the method further comprises selecting the proxy frequency of the proxy signal outputted by the proxy circuit, while the constituent operational circuit operated at the selected operational frequency, as the target for the proxy frequency.

5. The method of claim 2, wherein said testing of the IC comprises testing the IC at a plurality of temperatures.

6. The method of claim 1, wherein said downlocking comprises distributing the selected one or ones of the target proxy frequency information, the bus-to-core frequency multiplier of the constituent operational circuit, the minimum Vcc, the maximum Vcc, the maximum temperature, and the bus frequency ratio multiplier.

7. The method of claim 1, wherein the method further comprises configuring the IC with the selected one or ones of the target proxy frequency, the bus-to-core frequency multiplier of the constituent operational circuit, the minimum Vcc, the maximum Vcc, the maximum temperature, and the bus frequency ratio multiplier.

8. The method of claim 7, wherein said configuring of the IC comprises a selected one of storing the selected one or ones of the target proxy frequency, the bus-to-core frequency multiplier of the constituent operational circuit, the minimum Vcc, the maximum Vcc, the maximum temperature, and the bus frequency ratio multiplier in one or more storage locations of the IC, and setting one or more fuses of the IC.

9. The method of claim 7, wherein the method further comprises configuring the IC with an adjustment to the target proxy frequency, to be also taken into consideration in said regulation of voltage to be applied to the IC.

10. The method of claim 7, wherein the method further comprises re-configuring the IC with a replacement one of at least a selected of the target proxy frequency, the bus-to-core frequency multiplier of the constituent operational circuit, the minimum Vcc, the maximum Vcc, the maximum temperature, and the bus frequency ratio multiplier.

11. The method of claim 1, wherein the method further comprises providing an adjustment to the target proxy frequency.

12. The method of claim 11, where the method further comprises providing an upgrade to control logic employed in regulating voltage applied to the IC.

13. The method of claim 1, wherein the method further comprises accepting electronic payment tendered for upgrading the target proxy frequency.

14. A method comprising:
    accepting a request to upgrade an integrated circuit (IC) of a client device, the IC having a constituent operational circuit and a proxy circuit, the target proxy frequency being a target for a proxy frequency of a proxy signal outputted by the proxy circuit, and the proxy frequency being reflective of a potential of an operational frequency of the constituent operational circuit, and to be taken into consideration in regulating voltage to be applied to the IC; and
    providing the client device with data to upgrade at least a selected one of a target proxy frequency, a bus-to-core frequency multiplier of a constituent operational circuit, a minimum Vcc, a maximum Vcc, a maximum temperature, a bus frequency ratio multiplier, and voltage regulation control logic associated with the IC.

15. The method of claim 14, wherein the IC is installed on the client device.

16. The method of claim 14, wherein the IC is configured with the target proxy frequency.

17. The method of claim 14, wherein the data comprises a selected one of a replacement target proxy frequency to replace said target proxy frequency associated with the IC, a replacement adjustment to replace an adjustment to be applied to said target proxy frequency prior to taking the target proxy frequency into consideration when regulating voltage to be applied to the IC, and an adjustment to at least one other adjustment to be applied to said target proxy frequency prior to taking the target proxy frequency into consideration when regulating voltage to be applied to the IC.

18. The method of claim 14, where said providing of the data is based at least in part on identification information of the IC, and the method further comprises the server device requesting for the identification information.

19. The method of claim 14, wherein the method further comprises accepting electronic payment tendered for upgrading the target proxy frequency.

20. A method comprising:
   requesting by a client device for an upgrade for an integrated circuit (IC), the IC having a constituent operational circuit and a proxy circuit, a target proxy frequency being a target for a proxy frequency of a proxy signal outputted by the proxy circuit, and the proxy frequency being reflective of a potential of an operational frequency of the constituent operational circuit, and to be taken into consideration in regulating voltage to be applied to the IC; and
   receiving by the client device data to upgrade at least a selected one of a target proxy frequency, a bus-to-core frequency multiplier of a constituent operational circuit, a minimum Vcc, a maximum Vcc, a maximum temperature, a bus frequency ratio multiplier, and voltage regulation control logic associated with the IC.

21. The method of claim 20, wherein the IC is installed on the client device.

22. The method of claim 20, wherein the IC is configured with the target proxy frequency.

23. The method of claim 20, wherein the data comprises a selected one of a replacement target proxy frequency to replace said target proxy frequency associated with the IC, a replacement adjustment to replace an adjustment to be applied to said target proxy frequency prior to taking the target proxy frequency into consideration when regulating voltage to be applied to the IC, and an adjustment to be combined with at least one other adjustment and applied to said target proxy frequency prior to taking the target proxy frequency into consideration when regulating voltage to be applied to the IC.

24. The method of claim 23, wherein the method further comprises associating the IC with the selected one of the replacement target proxy frequency, the replacement adjustment and the adjustment to be combined with at least one other adjustment.

25. The method of claim 24, wherein said associating comprises configuring the IC with the selected one of the replacement target proxy frequency, the replacement adjustment and the adjustment to be combined with at least one other adjustment.

26. The method of claim 20, where the data is provided based at least in part on identification information of the IC, and the method further comprises providing the server device with the identification information.

27. The method of claim 20, wherein the method further comprises tendering electronic payment for the data.

28. A system comprising:
   a networking interface;
   a storage device having programming instructions stored therein, designed to provide a client device with data to upgrade at least a selected one of a target proxy frequency, a bus-to-core frequency multiplier of a constituent operational circuit, a minimum Vcc, a maximum Vcc, a maximum temperature, a bus frequency ratio multiplier, and voltage regulation control logic associated with an integrated circuit (IC) having a constituent operational circuit and a proxy circuit, the target proxy frequency being a target for a proxy frequency of a proxy signal outputted by the proxy circuit, and the proxy frequency being reflective of a potential of an operational frequency of the constituent operational circuit, and to be taken into consideration in regulating voltage to be applied to the IC; and
   at least one processor coupled to the networking interface and the storage to execute the programming instructions.

29. The system of claim 28, wherein the programming instructions are designed to provide a selected one of a replacement target proxy frequency to replace said target proxy frequency associated with the IC, a replacement adjustment to replace an adjustment to be applied to said target proxy frequency prior to taking the target proxy frequency into consideration when regulating voltage to be applied to the IC, and an adjustment to at least one other adjustment to be applied to said target proxy frequency prior to taking the target proxy frequency into consideration when regulating voltage to be applied to the IC, as the data.

30. The system of claim 28, where said programming instructions are designed to provide the data based at least in part on identification information of the IC, and request for the identification information.

31. The system of claim 28, said programming instructions are designed to accept electronic payment tendered for upgrading the target proxy frequency.

32. A system comprising:
   a networking interface;
   a storage device having programming instructions stored therein, designed to receive from a server device data to upgrade at least a selected one of a target proxy frequency, a bus-to-core frequency multiplier of a constituent operational circuit, a minimum Vcc, a maximum Vcc, a maximum temperature, a bus frequency ratio multiplier, and voltage regulation control logic associated with an integrated circuit (IC) having a constituent operational circuit and a proxy circuit, the target proxy frequency being a target for a proxy frequency of a proxy signal outputted by the proxy circuit, and the proxy frequency being reflective of a potential of an operational frequency of the constituent operational circuit, and to be taken into consideration in regulating voltage to be applied to the IC; and
   at least one processor coupled to the networking interface and the storage to execute the programming instructions.

33. The system of claim 32, wherein the data comprises a selected one of a replacement target proxy frequency to replace said target proxy frequency associated with the IC, a replacement adjustment to replace an adjustment to be applied to said target proxy frequency prior to taking the target proxy frequency into consideration when regulating voltage to be applied to the IC, and an adjustment to be combined with at least one other adjustment and applied to said target proxy frequency prior to taking the target proxy frequency into consideration when regulating voltage to be applied to the IC.

34. The system of claim 33, wherein the programming instructions are further designed to associate the IC with the selected one of the replacement target proxy frequency, the replacement adjustment and the adjustment to be combined with at least one other adjustment.

35. The system of claim 34, wherein the programming instructions are further designed to configure the IC with the selected one of the replacement target proxy frequency, the replacement adjustment and the adjustment to be combined with at least one other adjustment.

36. The system of claim 32, where the data is provided based at least in part on identification information of the IC, and the programming instructions are further designed to provide the server device with the identification information.

37. The system of claim 32, wherein the programming instructions are further designed to tender electronic payment for the data.

* * * * *